(12) United States Patent
Yuen et al.

(10) Patent No.: US 7,612,676 B2
(45) Date of Patent: Nov. 3, 2009

(54) RFID TAG AND ANTENNA

(75) Inventors: Matthew Ming Fai Yuen, Hong Kong (CN); Bo Gao, Hong Kong (CN); Ross David Murch, Hong Kong (CN); Chi Ho Cheng, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 286 days.

(21) Appl. No.: 11/859,294

(22) Filed: Sep. 21, 2007

(65) Prior Publication Data

US 2008/0129511 A1 Jun. 5, 2008

Related U.S. Application Data

(60) Provisional application No. 60/872,774, filed on Dec. 5, 2006.

(51) Int. Cl.
*G08B 13/14* (2006.01)

(52) U.S. Cl. ............... 340/572.7; 340/572.1; 340/572.8

(58) Field of Classification Search .............. 340/572.1, 340/572.4, 572.7, 572.8; 343/700 MS, 725, 343/726, 767, 795, 909
See application file for complete search history.

(56) References Cited

U.S. PATENT DOCUMENTS

| | | | |
|---|---|---|---|
| 6,262,495 | B1 | 7/2001 | Yablonovitch et al. |
| 6,501,435 | B1 | 12/2002 | King et al. |
| 6,828,941 | B2 | 12/2004 | King |
| 6,914,562 | B2 | 7/2005 | Forster |
| 6,999,028 | B2 | 2/2006 | Egbert |
| 7,042,419 | B2 | 5/2006 | Werner |
| 7,193,563 | B2 * | 3/2007 | King et al. ............ 343/700 MS |
| 7,405,707 | B2 * | 7/2008 | Murofushi et al. .......... 343/725 |
| 7,411,552 | B2 * | 8/2008 | King et al. ............ 343/700 MS |
| 7,535,364 | B2 * | 5/2009 | Sakama et al. ........... 340/572.7 |
| 2007/0241439 | A1 * | 10/2007 | Chung et al. ................ 257/679 |

OTHER PUBLICATIONS

Abedin, M. Faisal et al.; "Effects of EBG Reflection Phase Profiles on the Input Impedance and Bandwidth of Ultrathin Directional Dipoles," IEEE Transaction on Antennas and Propagation, vol. 53, No. 11, Nov. 2005, pp. 3664-3672.

(Continued)

*Primary Examiner*—Van T. Trieu
(74) *Attorney, Agent, or Firm*—Stites & Harbison PLLC; Ross F. Hunt, Jr.

(57) ABSTRACT

The present invention relates to an RFID Tag and Antenna for use with an RFID tag and a method of radio frequency identification (RFID). The RFID Tag comprises a RFID chip 5 for storing data, an antenna 6 and an electromagnetic band gap substrate 12. The RFID chip 5 and the antenna 6 are mounted above the electromagnetic band gap substrate 12. The electromagnetic band gap substrate has a reflection phase which is different from 180° at the operation frequency of the antenna. The electromagnetic band gap substrate enables the RFID to operate even if it is mounted on a conductive object, as the reflection phase is not 180° so it does not destructively interfere with the radiation from the antenna at the operating frequency. Preferably the reflection phase is between 340° and 115° or −95° and 145°. The preferred embodiment uses a band gap substrate having two mushroom-like conductive layers 3, 7 with a dielectric in between.

20 Claims, 5 Drawing Sheets

OTHER PUBLICATIONS

Sievenpiper, Dan et al.; "High-Impedance Electromagnetic Surfaces with a Forbidden Frequency Band," IEEE Transactions on Microwave Theory and Techniques, vol. 47, No. 11, Nov. 1999, pp. 2059-2074.

Yang, Fan, "Reflection Phase Characterizations of the EBG Ground Plane for Low Profile Wire Antenna Applications," IEEE Transactions on Antennas and Propagation, vol. 51, No. 10, Oct. 2003, pp. 2691-2703.

* cited by examiner

Reflection phase versus frequency for UHF RFID application

Cross-sectional view of two-layer EBG

RFID TAG AND ANTENNA

FIELD OF THE INVENTION

The invention relates to a RFID tag, an antenna for use with an RFID tag and a method of radio frequency identification (RFID). Preferred embodiments use an electromagnetic band gap. Preferred embodiments use a dipole antenna.

DESCRIPTION OF PRIOR ART

Radio frequency identification (RFID) is used in a number of applications in which a RFID tag is attached to objects. The RFID tag has an antenna, usually of the dipole type. The antenna is typically arranged for transmitting or receiving ultra high frequency (UHF) signals and the RFID tag may receive both power and data from a data reader's antenna, which communicates with the antenna of the RFID tag. Generally, a RFID antenna is designed for a specific or a narrow range of objects tracking. The radio frequency identification (RFID) tag is attached to objects which are to be tracked. The electromagnetic properties of the objects can affect the impedance, bandwidth and radiation efficiency of the radio frequency identification (RFID) antenna. This influence on the antenna is much strongly when the RFID antenna is near conductive objects. In fact, a radio frequency (RFID) tag with a dipole type antenna may not work when it is attached to a conductive object. This presents a difficulty if it is desired to track conductive objects (e.g. metal tins or foil wrapped objects).

To overcome this problem, U.S. Pat. No. 6,501,435 issued Dec. 31, 2002 to King et al. proposes using a slot antenna, while U.S. Pat. No. 6,914,562 issued Jul. 5, 2005 to Forster proposes using a monopole or slot antenna.

An electromagnetic band gap substrate is a substrate which exhibits a forbidden band gap at certain frequencies. At the forbidden frequencies, the surface wave can not transmit along the surface of electromagnetic band gap material and as a result the reflection phase from the surface of electromagnetic band gap material changes from 180° to −180° within the forbidden frequencies. An electromagnetic band gap substrate can operate as a reflector for which the reflection phase of the surface changes with frequency. An example of an electromagnetic band gap substrate is given in U.S. Pat. No. 6,262,495 issued Jul. 17, 2001 to Yablonovitch et al.

BRIEF SUMMARY OF THE INVENTION

A first aspect of the present invention provides a radio frequency identification (RFID) tag, which may be used for tracking a variety of objections. The tag has an RFID chip for storing data, an antenna and an electromagnetic band gap substrate. The electromagnetic band gap substrate may have a ground plane. It may comprise at least two conductive layers (one of which may be a ground plane) and one or more dielectric layers lying between the conductive layers. However, a ground plane and/or a dielectric between two conductors are not essential. In some embodiments the band gap substrate may be simply a single conductive layer or a single dielectric layer.

The antenna is positioned proximate (e.g. above) the electromagnetic band gap substrate. The electromagnetic band gap substrate has a reflection phase, which is different from 180° at the operation frequency of the antenna. Preferably the antenna is a dipole type antenna.

As the reflection phase is not 180 degrees, it does not destructively interfere or interferes less with the radiation from the antenna at is operating frequency. The antenna can therefore be placed closer than one quarter wavelength away from the substrate (one quarter wavelength is the usual requirement for a conductive substrate). The reflection phase of the electromagnetic band gap substrate may thus improve the performance of antenna including antenna impedance and radiation efficiency. The electromagnetic band gap substrate may insulate the RFID tag from objects behind it and render the RFID tag less sensitive to such objects so that the tag can for example be mounted on a conductive object.

The electromagnetic band gap substrate has a high impedance surface. The surface of electromagnetic band gap may act like a lumped circuit. The surface impedance could be calculated by the following equation.

$$Z = \frac{j\omega L}{1 - \omega^2 LC} \quad (1)$$

Where Z is the impedance of surface, ω is the frequency of incident electromagnetic wave, L is the sheet inductance and C is the sheet capacitance. So the surface impedance becomes infinite when the frequency is as below $$\omega_0 = \frac{1}{2\pi\sqrt{LC}} \quad (2)$$

Due to the high impedance at this frequency, the electromagnetic wave could not transmit along the surface.

The RFID tag antenna may be used to receive a signal and data from an external reader antenna that tracks the RFID tags. The RFID tag antenna may also used to transmit a signal to an RFID reader antenna.

The RFID tag antenna may attach to, or be formed above the electromagnetic band gap substrate. Preferably the RFID tag antenna is an antenna with an impedance matching the impedance of the RFID chip. In one embodiment, the antenna is attached on the surface of a dielectric material and the dielectric material is attached on the surface of electromagnetic band gap substrate.

In preferred embodiments the operation frequency or L and of operating frequencies of the antenna may be from 750 MHz to 960 MHz, from 2.0 GHz to 2.6 GHz or from 5.0 GHz to 6.0 GHz.

In preferred embodiments the electromagnetic band gap substrate has zero phase reflection (i.e. the reflected radiation has the same phase as the incident radiation at the operating frequency, or at a frequency within the band of operating frequencies, of the antenna). For example, there may be zero phase reflection at a frequency within the range 750 MHz to 960 MHz or in other embodiments within the range 2.0 GHz to 2.6 GHz or 5.0 GHz to 6.0 GHz.

One advantage of preferred embodiments of the invention is that the RFID tag may be made slim. Preferably the electromagnetic band gap substrate has a thickness less than 0.1 of the wavelength of the operation frequency of the antenna. In some embodiments the electromagnetic band gap substrate has a thickness less than 0.01 of the wavelength of the operation frequency of the antenna. In still other embodiments the electromagnetic band gap substrate has a thickness less than 0.001 of the wavelength of the operation frequency of the antenna.

Preferably the reflection phase of the electromagnetic band gap substrate is between 180° and −180° (but not 180 degrees or −180 degrees) at the operation frequency or operating frequency band of antenna. For example the reflection phase may be between 179° and −179° at the operating frequency or operating frequency band of the antenna.

The antenna may perform best when the angle of phase reflection is within a certain range, for example 40° to 115° and −95° to −145°. The precise range of phase reflection at which the antenna is most effective depends upon the distance between the antenna and the electromagnetic band gap substrate.

Preferably the overall thickness of the RFID tag (including the RFID chip, the antenna and the electromagnetic band gap substrate) is less than 0.1 of the wavelength of the operation frequency of the antenna. In some embodiments the overall thickness of the RFID tag is less than 0.01 of the wavelength of the operation frequency of the antenna. In still further embodiments the overall thickness of the RFID tag is less than 0.001 of the wavelength of the operation frequency of the antenna. Preferably the RFID Chip has a thickness between 0.3 mm and 0.5 mm. The antenna may be positioned between the substrate and the RFID chip (i.e. the RFID chip is mounted on the antenna).

Preferably the electromagnetic band gap substrate comprises a first layer of conductive materials, a second layer of conductive material and a dielectric between said two conductive layers.

Preferably the electromagnetic band gap substrate has a first conductive layer, a second conductive layer and a common conductive ground plate/plate electrically connected to said first and second conductive layers and a dielectric between the first and second conductive layers and the second conductive layer and the ground plate.

The distance between the antenna and electromagnetic band gap surface is preferably less than 0.05 wavelength of the RFID antenna operation frequency. The distance between the first and second conductive layers is preferably less than 0.005 wavelength of the RFID antenna operation frequency. The distance between the second conductive layer and the ground plane is preferably less than 0.05 wavelength of the RFID antenna operation frequency. The band gap is determined by the patch width, dielectric constant of first dielectric layer and distances between first, second layers and the ground plane.

Preferably the first conductive layer is positioned between the antenna and the second conductive layer. Preferably there is an air gap or dielectric between the antenna and the first conductive layer.

The antenna may be mounted to one side of the electromagnetic band gap substrate and the opposite side of the substrate mounted to an item to be tracked by the RFID tag.

It is preferred that the part of the substrate, which is mounted to the item to be tracked, has a relative magnetic permeability greater than one.

A second aspect of the present invention provides an antenna system for use with an RFID tag, the system comprising an electromagnetic band gap substrate comprising a first conductive layer, a second conductive layer, a common conductive ground plate/plate electrically connected to said first and second conductive layers and a dielectric between said first and second conductive layers and said second conductive layer and said ground plate; and an antenna mounted proximate the first conductive layer.

Preferably there is a dielectric or air gap between the first conductive layer and the antenna.

The second aspect of the invention may, except where logic or the context demands otherwise, have any of the features of the first aspect of the invention discussed above.

The antenna and the conductive layer of the electromagnetic band gap substrate may be formed by a wide variety of materials and processes. For instance, one process involves printing conductive materials, such as silver conductive paste. Additional methods of forming a conductive patch and antenna include sputtering material, lamination conductive foil or any known method in the art for forming conductive patterns on film. Control of the thickness and smoothness of the conductive layer of the electromagnetic band gap substrate is an important factor.

In one embodiment, the electromagnetic band gap substrate is a type of mushroom-like three layer structure. Each element is a resonant circuit. Each of the elements is connected with each other to form an array. The dielectric material is a dielectric sheet. The first and second conductive layers comprise conductive patches which are formed on dielectric layers and are connected to a continuous conductive ground plane by conductive vias. The vias connecting the first layer of conductive patches pass through two layers of dielectric material and the vias connecting the second layer of conductive patches to the ground plane pass through one layer of dielectric material.

The RFID tag with electromagnetic band gap substrate can be used for conductive object tracking. In one embodiment, the RFID tag with the electromagnetic band gap substrate is attached on a conductive object such as a metallic container or can.

In one embodiment of the above RFID tag, the electromagnetic band gap substrate is used for ultra high frequency radio identification (UHF RFID) tag. The operation frequency of this tag is from 860 MHz to 960 MHz, or a band within that range.

In one embodiment of the above RFID tag, the electromagnetic band gap substrate is used for microwave radio frequency identification tag. The operation frequency of this tag is 2.45 GHz or 5.8 GHz.

The operation frequency of the RFID tag and/or antenna may be between 2.0 GHz and 2.6 GHz.

The operation frequency of the RFID tag and/or antenna may be between 750 MHz and 960 MHz.

The operation frequency of the RFID tag and/or antenna may be between 5 GHz and 6 GHz.

DETAILED DESCRIPTION

The present invention is useful for radio frequency identification ("RFID") tags and their antenna systems and can be attached on conductive objects to communicate information with an RFID reader. The RFID tag may be either an active tag which has an internal power source, or a passive tag which gets its power from the electromagnetic waves emitted by the RFID reader. RFID has many applications in areas such as item identification and retail management.

Figures 1A, 1B:
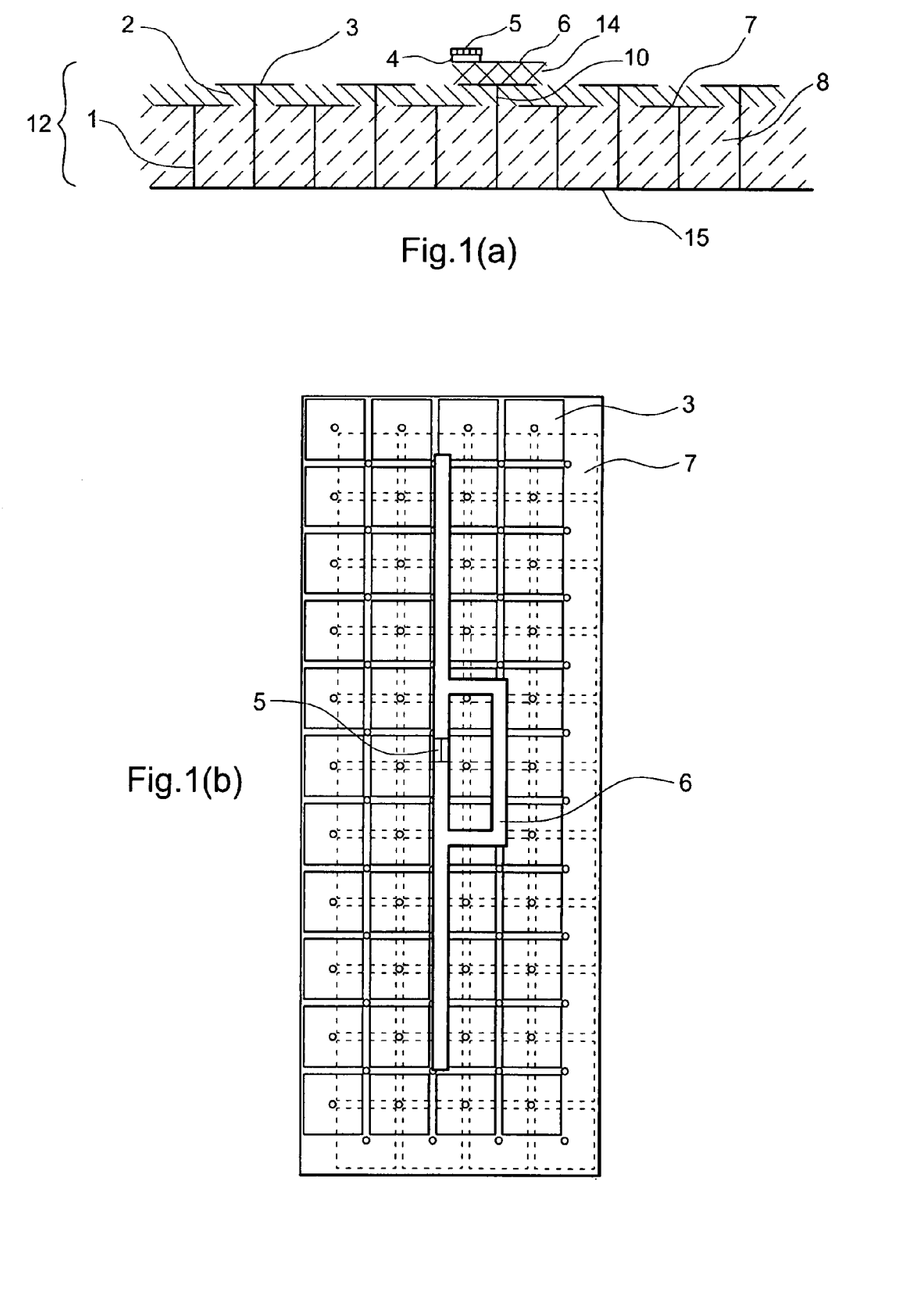
FIG. 1(a) is the cross-sectional view of the RFID tag.
FIG. 1(b) is the top view of the RFID tag.

FIGS. 1(a) and 1(b) show one embodiment of the present invention. An RFID chip 5 is attached to a RFID antenna 6 by anisotropic conductive adhesives (ACAs) 4. The RFID chip may be either active in generating its own power or passive in reflecting energy back to original source (the RFID reader). The RFID chip 5 and antenna 6 are mounted above an electromagnetic band gap substrate 12 with a thin layer of dielectric material 14 between them. In this embodiment, the thickness of dielectric material 14 between the substrate 12 and the antenna 6 is 130 micrometer.

In this embodiment, the antenna used is a half wave dipole type antenna. The antenna is formed from a conductive material. This type of antenna would be degraded by presence of objects behind it, if it was not for the electromagnetic band gap substrate 12.

Figure 2:
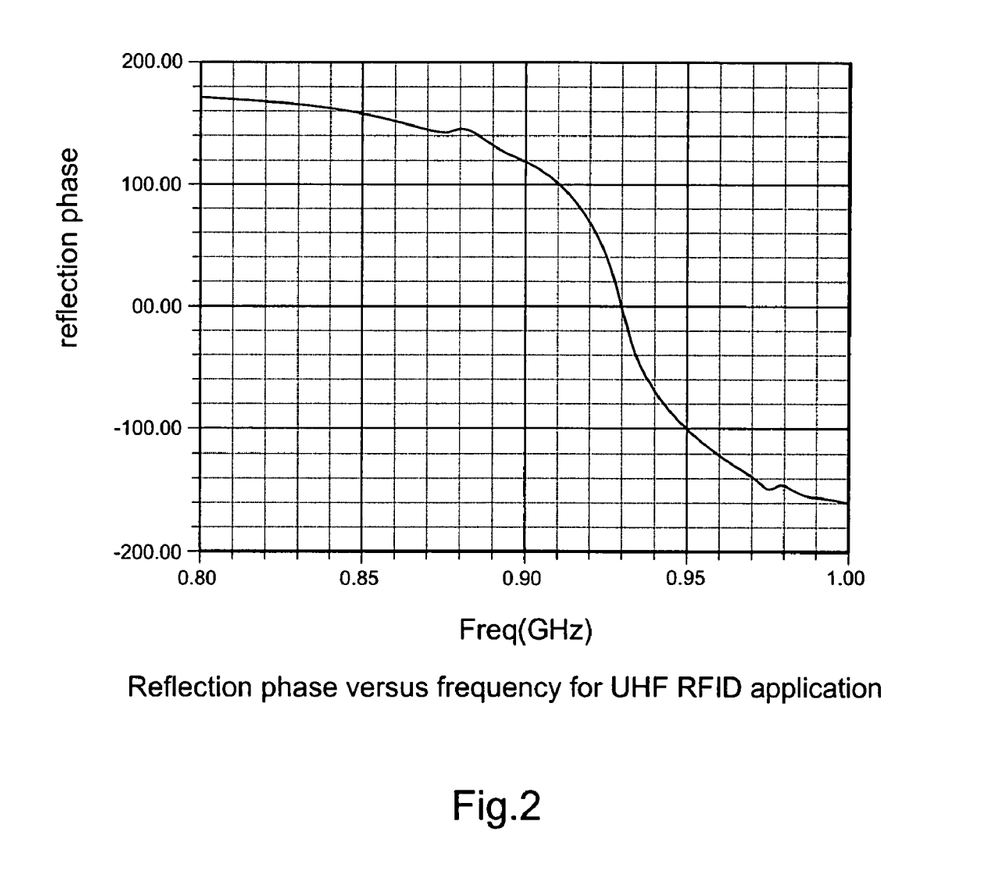
FIG. 2 is a diagram illustrating the reflection phase of the RFID tag's electromagnetic band gap substrate.
Figure 3:
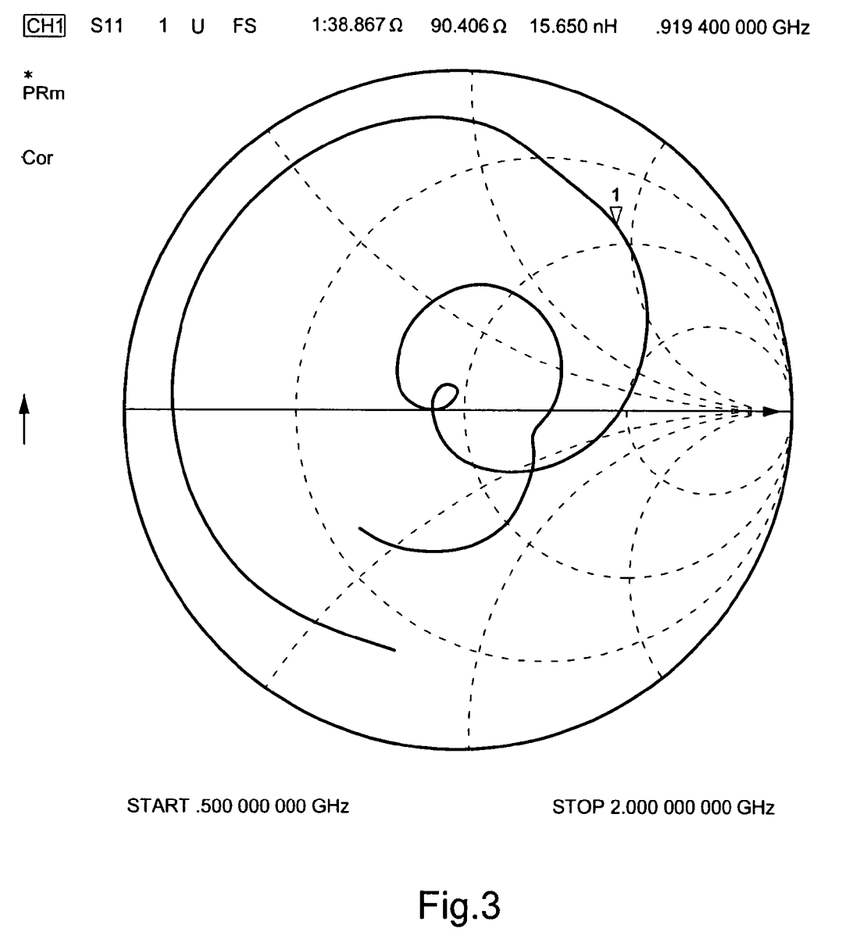
FIG. 3 is a diagram illustrating the impedance of an RFID antenna on an electromagnetic band gap substrate, as in FIGS. 1(a) and (b) with a 0.1 mm thick dielectric material between them at 919 MHz.

In theory, a conductive surface reflects electromagnetic waves with 180° phase change. This reflected electromagnetic wave influences the performance of an antenna in front of the conductive surface, including radiation pattern and the radiation frequency. This effect weakens the antenna performance strongly when antenna is near the conductive surface. The electromagnetic band gap substrate proposed by this invention, aims to lessen this effect. FIG. 2 shows the phase of a reflected electromagnetic wave from an electromagnetic band gap plane. The phase of the reflective wave varies continuously from −180° to 180° depending on the frequency of the wave. The antenna will be most effective when the angle phase reflection is 40° to 115° and −95° to −145° or a different range of angles depending on the distance between antenna and electromagnetic band gap substrate. At these phase angles the gain is preferably larger than 0 dBi; and the read range of the RFID tag is preferably larger than 2 meters.

The result shown in FIG. 2 confirm that a RFID tag with operation frequency of 915 MHz can work even when it is positioned near the electromagnetic band gap substrate, because the phase angle at 915 MHz is within the range of an effective frequencies discussed above (i.e. between 40° and 115°).

In this embodiment, the electromagnetic band gap substrate 12 is mushroom-like and comprises two arrays of metal patches 3, 7 with vias 10, 1, two layers of dielectric material 2, 8 and one ground plane 15. FIGS. 1(a) and 1(b) show the structure of the three layer electromagnetic band gap substrate 12. A first conductive layer 3 comprises square patches formed of conductive materials. A second conductive layer 7 also comprises square patches formed of conductive materials. Vias 10 (e.g. conductive metal lines) connect the square patches of the first conductive layer to a continuous conductive ground plane 15. Vias 1 connect the square patches on second conductive layer to the continuous conductive ground plane 15. A first layer of dielectric material 2 between the first and second conductive layers 3, 7 has a dielectric constant larger than one. A second layer of dielectric material 8 between the second conductive layer 7 and the ground plane 15 has a value of permeability equal to or larger than one. The first and second dielectric layers 2, 8 may be made of the same material or different materials.

In this embodiment, the surface of the mushroom structure is modeled to be a lumped circuit. The top conductive layer 3 is used as a loading capacitor and the vias 10 connecting the top layer 3 to the ground 15 acts as an inductor. The impedance of the surface provided by the substrate 12 for a perpendicular incident electromagnetic wave is $$Z = \frac{j\omega L}{1 - \omega^2 LC} \quad (1)$$

Where Z is the impedance of surface, ω is the frequency of incident electromagnetic wave, L is the inductance and C is the capacitance. So the surface impedance became infinite when the frequency is as below:

$$\omega_0 = \frac{1}{\sqrt{LC}} \quad (2)$$

From equation 1, it is observed that the surface impedance changes with the frequency which is different from conductive layer and the reflected phase of electromagnetic band gap substrate varies continuously from 180° to −180°. The relation between frequency and reflected phase is given by the following equation:

$$\theta(f) = \operatorname{Im}\left[\ln\left(\frac{af^2 + jbf - c}{-af^2 + jbf + c}\right)\right] \quad (3)$$

Where θ is the reflected phase and a, b and c are constants.

Because mutual impedance is introduced by the reflected electromagnetic wave, this reflected electromagnetic wave has effects on the antenna impedance and resonance frequency. Because of this, the resonance frequency of the antenna 6 near electromagnetic band gap plane 12 shifts to be higher frequency than it is in free space. Based on the equations shown above and considering the shift of resonance frequency, a prototype of electromagnetic band gap substrate with a forbidden frequency at about 900 to 925 MHz was prepared. By equation 3, FIG. 2 shows the relation between reflection phase and frequency. It is clear that there is a continuous phase change. The antenna 6 on the electromagnetic band gap substrate 12 was designed based on a dipole antenna.

Figure 4:
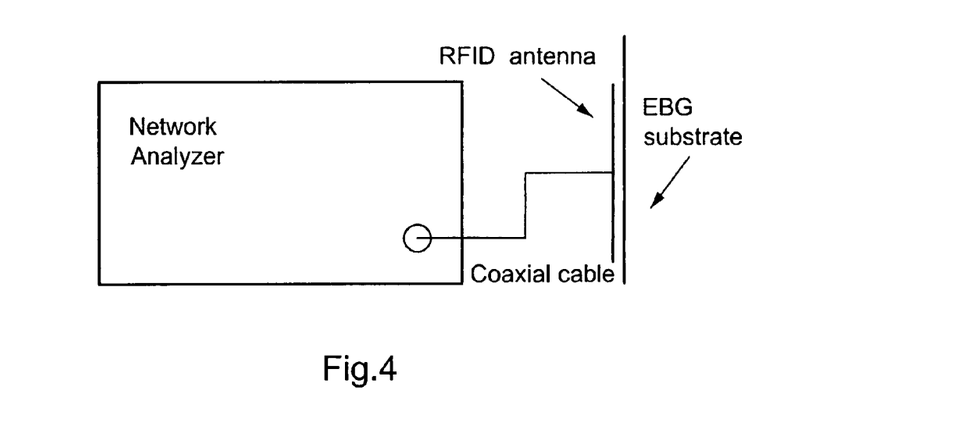
FIG. 4 shows an arrangement for testing the antenna.
Figure 5:
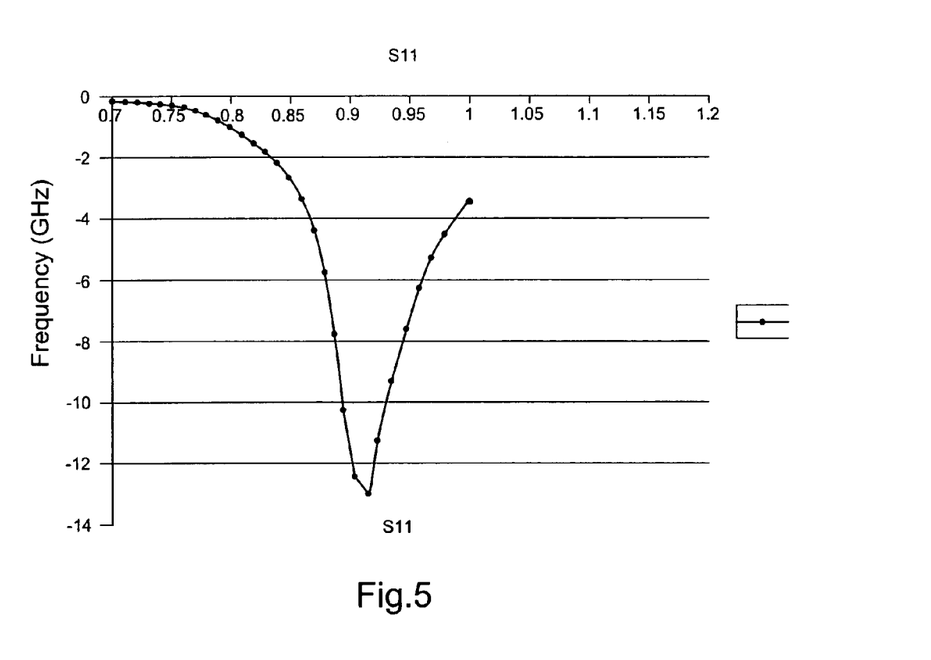
FIG. 5 is a diagram illustrating the return loss of the RFID antenna of FIG. 1(a) and FIG. 1(b) for a RFID chip with an impedance of 30+100j.

Because adding an external matching network with a lumped circuit is costly for a ultra high frequency radio frequency identification (UHF RFID) tag and achieving maximum power transfer to passive RFID chip is very important, the UHF RFID antenna is preferably directly matches with the RFID chip impedance. However, the impedance of the RFID chip may be different from 50Ω. As an experiment, a RFID chip 5 which had an impedance value of 30+100j was connected on the antenna 6. To match the complex impedance of this chip, FIG. 1 (b) shows a modified dipole antenna 6 which had a large imaginary impedance. The antenna was a 150 mm long dipole with a short line connecting two parts. The short line was 55 mm long and 22 mm away from the RFID chip pad. This antenna was attached on the electromagnetic band gap substrate 12 with a 130 μm thick PET film (a dielectric) 14 between them. FIG. 4 shows the testing vehicle of the modified dipole antenna on electromagnetic band gap substrate. The antenna 6 was connected to an Agilent Network Analyzer by a coaxial transmission line and a lumped element balun. FIG. 5 shows the measured return loss ($S_{11}$) between antenna impedance and Agilent's RFID chip. FIG. 4 shows that the antenna has a large bandwidth within $S_{11}$<−10 dB.

$S_{11}$ is also called as return loss. The return loss is calculated using $$|S_{11}|^2 = \left|\frac{Z_L - Z_S^*}{Z_L + Z_S}\right|^2, \ 0 \le |S|^2 \le 1 \qquad (1)$$

Where ZL is the antenna impedance and Zs is the chip impedance from which we can calculate the bandwidth for a −10 dB return loss. −10 dB return loss means 90% power is transmitted from the antenna to RFID chip.

Thus a preferred embodiment of the present invention provides an RFID tag with an electromagnetic band gap substrate. The electromagnetic band gap substrate may comprise two layers of conductive material, two layers of dielectric material and a continuous conductive ground plane. The RFID tag has an RFID antenna and an RFID chip, which are impedance matched with each and mounted near the substrate. The RFID chip can thus communicate with an external RFID reader via the RFID tag's antenna. The reflection phase of the electromagnetic band gap substrate is matched with the RFID antenna. 'Matching the reflection phase of the substrate with the RFID antenna' means that the phase of the reflected wave is preferably at 90° from the incident wave of the RFID antenna. The reflection phase of the substrate is preferably between 40° and 135° at the operation frequency of the RFID antenna.

Figure 6A:
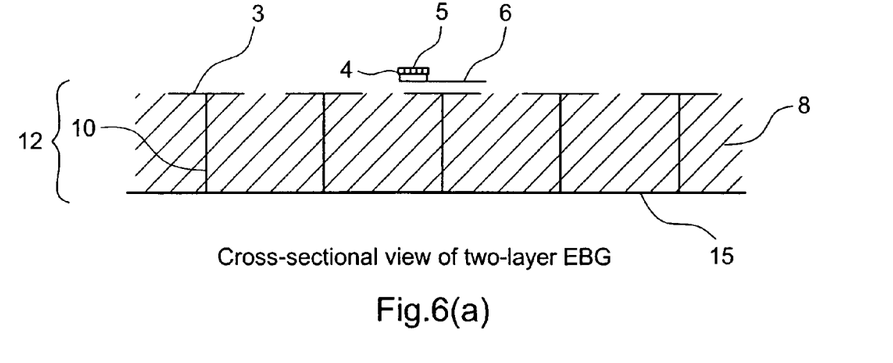
FIG. 6(a) and FIG. 6(b) show an alternative embodiment of the RFID tag and antenna.
Figure 6B:
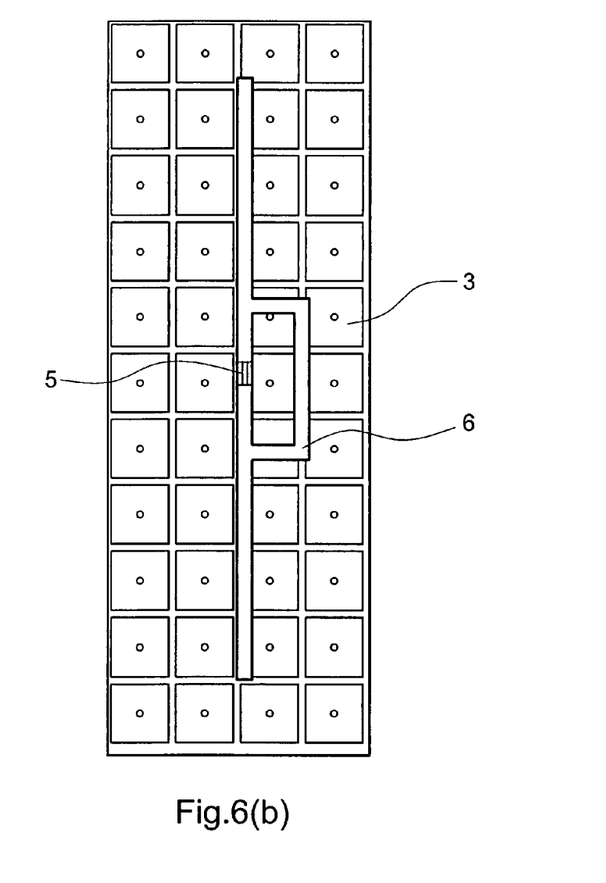

The embodiment described above has an electromagnetic band gap substrate comprising two conductive layers with a mushroom-like configuration, plus a conductive ground plate and dielectric layers between the conductive layers. However, it will be possible to deviate from this specific configuration and still get the advantage of the invention. For example, the band gap substrate could have only 3 layers in total (e.g. a dielectric layer between a single upper conductive plane and a ground plate), or even be a single layer (dielectric or conductor) as long as it has an EM band gap with a forbidden frequency. A further example is given in FIGS. 6(*a*) and 6(*b*), in which the EM band gap substrate comprises a mushroom-like conductor layer 3 connected to a ground plane by vias 10. The vias 10 pass through a dielectric layer 8 between the conductor layer 3 and ground plane 15. The RFID Chip 5 is attached by adhesive to the antenna 6, which is positioned above the conductor layer 3.

What is claimed is:

1. An RFID tag comprising:
   a) an RFID chip for storing data;
   b) an antenna which is connected to the RFID chip and has an operating frequency; and
   c) an electromagnetic band gap substrate positioned proximate the antenna, said electromagnetic band gap substrate having a reflection phase which is different from 180° at said operation frequency of the antenna.

2. The RFID tag of claim 1 wherein the phase reflection is zero at the operating frequency of the antenna.

3. The RFID tag of claim 1 wherein the operation frequency of the antenna is from 750 MHz to 960 MHz.

4. The RFID tag of claim 1 wherein the operation frequency of the antenna is from 5.0 GHz to 6.0 GHz.

5. The RFID tag of claim 1 wherein the electromagnetic band gap substrate has zero phase reflection at a frequency between 750 MHz to 960 MHz.

6. The RFID tag of claim 1 wherein the electromagnetic band gap substrate has zero phase reflection at a frequency between 2.0 GHz and 2.6 GHz.

7. The RFID tag of claim 1 wherein the electromagnetic band gap substrate has zero phase reflection at a frequency between 5.0 GHz and 6.0 GHz.

8. The RFID tag of claim 1 wherein the electromagnetic band gap substrate has a thickness less than 0.1 of the wavelength of the operation frequency of the antenna.

9. The RFID tag of claim 1 wherein the electromagnetic band gap substrate has a thickness less than 0.01 of the wavelength of the operation frequency of the antenna.

10. The RFID tag of claim 1 wherein said reflection phase of electromagnetic band gap substrate is between 40° and 115° or −95° to −145° at the operation frequency of antenna.

11. The RFID tag of claim 1 wherein the overall thickness of the RFID tag is less than 0.1 of the wavelength of the operation frequency of the antenna.

12. The RFID tag of claim 1 wherein the overall thickness of the RFID tag is less than 0.01 of the wavelength of the operation frequency of the antenna.

13. The RFID tag of claim 1 wherein the electromagnetic band gap substrate has a first conductive layer, a second conductive layer and a common conductive ground plate/plate electrically connected to said first and second conductive layers and a dielectric between the first and second conductive layers and the second conductive layer and the ground plate.

14. The RFID tag of claim 1 wherein the first conductive layer is positioned between the antenna and the second conductive layer.

15. The RFID tag of claim 1 wherein there is an air gap or dielectric between the antenna and the first conductive layer.

16. The RFID tag of claim 1 wherein the antenna is mounted to one side of substrate and the opposite side of the substrate is mounted to an item to be tracked by the RFID tag.

17. The RFID tag of claim 1 wherein the electromagnetic band gap structure has two conductive layers with a mushroom-like structure.

18. The RFID tag of claim 1 wherein a bottom layer of the electromagnetic band gap substrate for mounting on an object to be tracked by RFID tag, has a permeability greater than 1.

19. An antenna system for use with an RFID tag, the system comprising an electromagnetic band gap substrate comprising a first conductive layer, a second conductive layer, a common conductive ground plate electrically connected to said first and second conductive layers and a dielectric between said first and second conductive layers and said second conductive layer and said ground plate; and an antenna mounted proximate the first conductive layer.

20. The antenna system of claim 19 wherein there is a dielectric or air gap between the first conductive layer and the antenna.

* * * * *